Nov. 14, 1939.    T. V. BUCKWALTER    2,180,316
LOCOMOTIVE RUNNING GEAR
Filed June 18, 1938    2 Sheets-Sheet 1
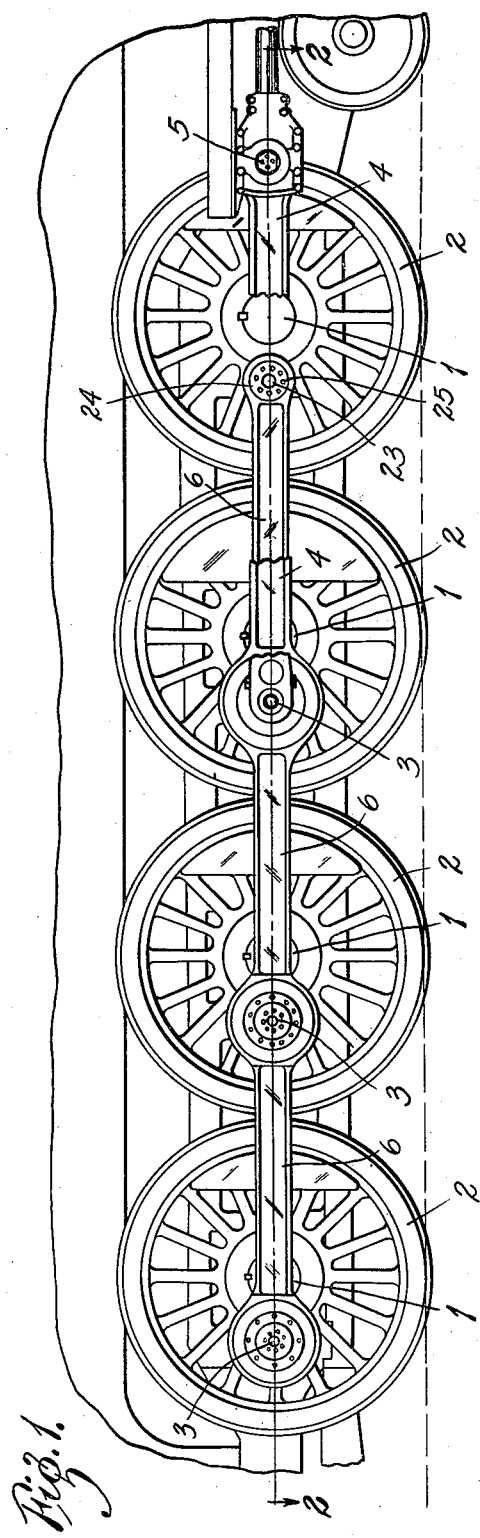
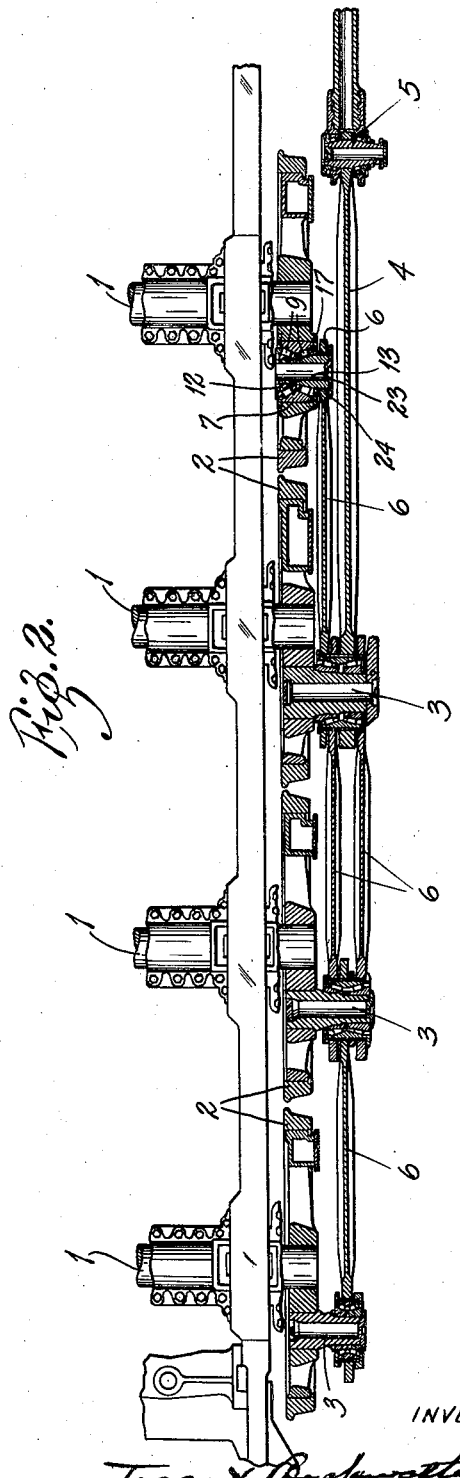
INVENTOR:
Tracy V. Buckwalter
HIS ATTORNEYS.

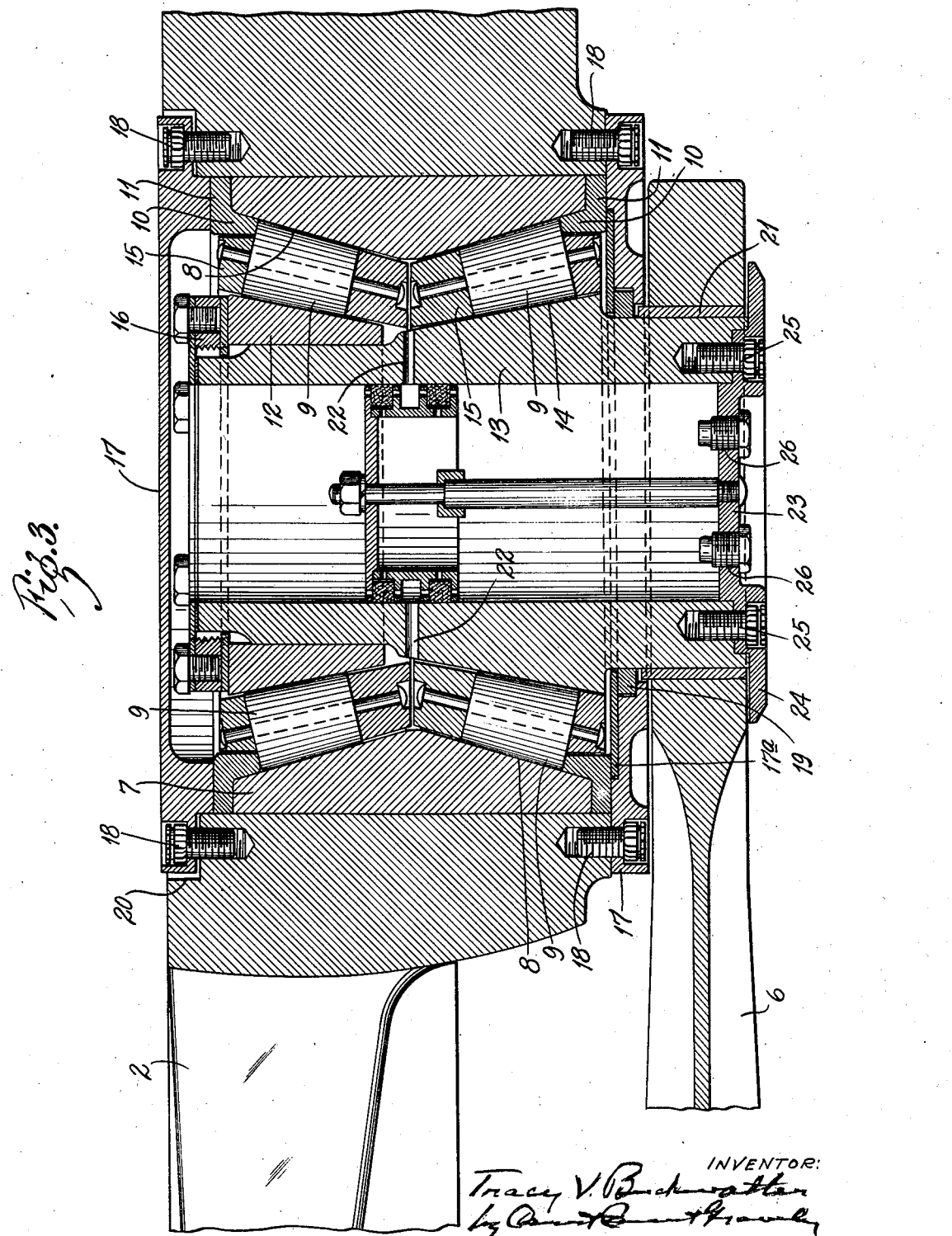

Patented Nov. 14, 1939

2,180,316

UNITED STATES PATENT OFFICE 2,180,316

LOCOMOTIVE RUNNING GEAR

Tracy V. Buckwalter, Massillon, Ohio, assignor to The Timken Roller Bearing Company, Canton, Ohio, a corporation of Ohio Application June 18, 1938, Serial No. 214,445

9 Claims. (Cl. 105—84)

My invention relates to locomotive running gears. In the conventional types of locomotives, the main rods are pivotally connected to crank pins rigidly mounted on the wheels of the second driving axle and the front connecting rods are pivotally connected at their rear ends to these same crank pins and at their front ends to crank pins on the wheels of the front driving axle, the front connecting rods being located between the main rods and the driving wheels. The principal object of the present invention is to devise means whereby all of the driving and connecting rods may be located closer to the wheels than has heretofore been practicable when roller bearings are used so as to obtain numerous advantages that are hereinafter mentioned. Another principal object is to shorten the stressed end portions of all the crank pins. Another object is to reduce the distance between the axes of the engine cylinders. Another object is to improve the mechanical construction of the running gear. The invention consists principally in pivotally mounting the crank pins of the front driving wheels in the front wheel centers and making the connections between the front connecting rods and said crank pins shorter, endwise of said crank pins, than has heretofore been practicable. The invention also consists in the arrangements and combinations of parts hereinafter described and claimed.

In the accompanying drawings wherein like reference numerals refer to like parts wherever they occur:

Fig. 1 is a side elevation of a locomotive running gear with a portion of the main rod broken away to show the front connecting rod;

Fig. 2 is a view partly in plan and partly in horizontal section on the line 2—2 of Fig. 1; and Fig. 3 is an enlarged horizontal sectional view of a front crank pin and parts associated therewith.

In common with the conventional type of locomotive running gear, the running gear illustrated in the accompanying drawings comprises axles 1, driving wheels 2 fixedly mounted thereon, crank pin members 3 carried by the wheels, main driving rods 4 pivotally mounted at one end on the crank pins of the main driving wheels and pivotally connected at the other end to the cross-heads 5 of the engine, and connecting rods 6 whose opposite ends are mounted on the crank pins of adjacent axles.

According to the present invention, the front driving wheels are formed with eccentrically located longitudinal bores large enough to accommodate the cups or outer raceway members 7 of tapered roller bearings. The outer surface of such cup or outer raceway member has a sliding fit in said bore and its inner surface tapers inwardly from each end to form two conical raceways 8 for two series of tapered rollers 9. At the large ends of the outer raceways are inwardly extending thrust ribs 10 in position for the large ends of the tapered rollers to bear against. Preferably, as shown, these thrust ribs are formed on separate rings 11 that are fitted in the ends of the wheel bore and bear against the ends of the outer raceway member 7 and are positioned and held in place as hereinafter described.

The inner conical raceways for the respective series of rollers are made on separate members, one member 12 being a ring or sleeve with its outer surface formed into a conical raceway and the other member 13 being elongated and having the outer surface of its middle portion 14 formed into a conical raceway. The sleeve or ring-shaped member 12 is mounted on one end portion of the second member 13 with their two raceway surfaces tapering toward each other, while the opposite end of said second member projects beyond the wheel and constitutes the crank pin proper or support for the connecting rod. The series of tapered rollers 9 in suitable cages 15 are interposed between the inner and outer raceways. The inner end of the crank pin member is provided with a thread on which works a threaded nut 16 which abuts against the end of the inner raceway sleeve 12 and thus serves to adjust said sleeve axially on the crank pin member and as an abutment for resisting the end thrust of said sleeve. Closure plates 17 are secured, as by bolts 18, to the opposite faces of the driving wheel center and furnish abutments for the outer raceway member or the separate thrust rings above mentioned, as the case may be. The thrust rings may be clamped axially by means of the closure plates 17. Preferably the inner end of the bore in the front driving wheel center is counterbored, as at 20, to receive the outer closure plate and thus shorten the overall length of the roller bearing construction endwise of the crank pin.

Each of the outer raceway members 7 is positioned by the thrust rib rings 11 and closure plates 17 and firmly clamped in position by the closure plates. The inner raceway members 12, 13 are adjusted into proper relation to the rollers 9 by moving the inner raceway sleeve 12 axially on the crank pin member 13 and securing it in adjusted position by means of the nut 16 on the inner end of said crank pin member. In this condition, the crank pin member is held firmly against axial movement except for the slight play required for the proper functioning of the tapered roller bearing.

The portion of the crank pin member that extends outwardly from the wheel constitutes the crank pin proper and serves as a support for the connecting rod. As there is a pivotal connection between each front driving wheel and its crank pin member, it is not necessary that the connection between such crank pin member and the connecting rod shall be pivotal. However, I prefer to interpose a bronze bushing 21 between said crank pin member and the front connecting rod, mounting the bushing in the eye of the rod and around the crank pin with a fit that is fairly tight but capable of yielding to permit the bushing to creep circumferentially and to slip axially if and when service conditions require it.

Preferably, each of the front crank pin members 13 is made hollow and provided with radial passageways 22 through its wall at points between the adjacent ends of the inner raceways. The end of the crank pin is closed by a plate 23 whose main portion is inside the hollow pin or in a counterbore thereof and has an offset circumferential flange 24 which overlaps the bushing and adjacent portion of the front connecting rod. This closure plate is secured to the end of the crank pin by cap screws 25 whose heads preferably do not project beyond the outer face of said flange. The cover plate 23 is provided with plugged ports 26 for feeding lubricant into the interior of said crank pin member conformably to the system of lubrication more fully described in my Patent No. 2,040,803.

The plain bearings between the front coupling rods and the crank pin members are considerably shorter lengthwise of the crank pin members than roller bearings would be. Consequently, with equal clearances, the front coupling rods may be located considerably closer to the wheels, due regard being had for the need for mechanical clearance. For instance, in one conventional type of running gear equipped with roller bearings now in service on the Pennsylvania and New York Central railroads, the distance between the face of a front wheel and the center line of the front connecting rod is seven inches, whereas the construction hereinbefore described permits such distance to be reduced to about 3⅜ inches without sacrificing any merit. As the front driving rods are located between the main driving rods and the wheels, the shortening of the distance between the front connecting rods and the wheels enables the distance of the main driving rods to be shortened without any change of its bearings; and this, in turn, enables the other connecting rods to be brought closer to their wheels. Thus the change in the front crank pin connections enables all the crank pins to be made shorter and still accommodate roller bearings.

Many advantages result from such reduction of the distance from the center line of the front connecting rod to the face of the front driving wheel and such advantages are especially important with high speed locomotives. For instance, the stress on the main crank pin is very greatly reduced, amounting in the example above cited to about 43%. Likewise, the deflection of the crank pin is greatly reduced and deflection is a serious matter because of the weaving of the crank pin inside of the bearing which causes the contact on the working profile of the bearing to change continuously with speed and load. With the reduction of the deflection, deformation of the bearing is minimized to such an extent that the oil film will take care of it and keep practically uniform normal bearing contact. Again, the problem of balancing is simplified because the amount of balancing weights in the wheel required for counterbalancing the crank pin bearing and connecting rods is reduced and this, in turn, reduces the unsprung weight of the locomotive. Besides, the placing of the counterbalance weights is simplified, because the longer they overhang beyond the wheel the more difficult is it to obtain a true running balance.

Another very important advantage that results from decreasing the distance of the coupling rods from the wheels is that it enables the spread of the cylinders to be reduced by double the amount of such reduction, which, in turn, reduces the length of the steam and exhaust pipes and lessens the loss of steam accordingly.

What I claim is:

1. A locomotive driving gear comprising a main and secondary driving axles, wheels fixed on said axles, a main rod, connecting rods, crank pins for the respective wheels and roller bearings for the respective pins, the front driving wheels having eccentrically located bores in which are mounted the outer raceway members of the bearings for the front crank pins, the connections of the front connecting rods with the front crank pins being axially shorter than the length of said roller bearings, the connecting rods of the front driving wheels being located inwardly of the main driving rods and substantially as close thereto and to the main driving wheels as is consistent with the need for mechanical clearance.

2. A locomotive driving gear comprising a main and secondary driving axles, wheels fixed on said axles, crank pins for said wheels, connecting rods whose ends are connected to adjacent crank pins, and main driving rods pivotally connected to the crank pins on the wheels of the main driving axle, the connecting rods of the front driving wheels being located inwardly of the driving rods, and means for pivotally mounting the crank pins of the front driving wheels in the front wheel centers, and the other crank pins being rigidly mounted on their respective wheels and pivotally connected to their connecting rods, said pivotal mounting means comprising outer raceway members mounted eccentrically in bores in the respective front driving wheels, rollers interposed between said raceway members and said crank pins and means on said crank pins for preventing longitudinal displacement thereof, the connections of the front connecting rods with the front crank pins being axially shorter than the length of said roller bearings.

3. The combination of an axle, a wheel fixedly mounted thereon and having an ecccntric bore, an outer raceway member seated in said bore and having two conical raceways disposed with their small diameter ends adjacent to each other, an inner raceway member comprising two parts, of which one part has one conical raceway integral therewith and the other part is a sleeve on the first part and has a second conical raceway, rollers between the respective inner and outer raceways, the outer end portion of said first mentioned part of the inner raceway member projecting beyond the wheel, a rod and a connection between said end portion and said rod.

4. The combination of an axle, a wheel fixedly mounted thereon and having an eccentrically located bore, an outer raceway member seated in said bore and having two conical raceways disposed with their small diameter ends adjacent to each other, an inner raceway member comprising two parts, of which one part has one conical raceway integral therewith and the other part is a sleeve on the first part and has a second conical raceway, an adjustable ring having threaded engagement with the inner end of said first part and forming an abutment for said sleeve, rollers between the respective inner and outer raceways, the outer end of said first mentioned part of the inner raceway member projecting beyond the wheel, a rod and a connection between said end and said rod.

5. A locomotive driving gear comprising a main and secondary driving axles, wheels fixed on said axles, crank pins rigidly mounted on all but the front driving wheels, crank pins for the front driving wheels, means for pivotally mounting said last mentioned crank pins in the front wheel centers, connecting rods whose ends are connected to adjacent crank pins, and main driving rods pivotally connected to the crank pins on the wheels of the main driving axle, each of said pivotal mounting means comprising an outer raceway member fitting a bore in a front wheel center and having two inwardly tapering conical raceways, separate rings overlapping the outer ends of said raceways and constituting thrust ribs, clamping members fastened to the ends of the wheel hub and abutting against said thrust rings, a crank pin member having a conical raceway surface in cooperative relation with one of the raceways of said outer raceway member, a sleeve slidable on said crank pin member and having a conical raceway in cooperative relation with the other outer raceway, tapered rollers between the inner and outer raceways, and a nut having threaded engagement with the end of said crank pin member opposite the end of said sleeve whereby said nut abuts against the end of said sleeve and serves to adjust said sleeve axially on the crank pin member and as an abutment for resisting the end thrust of said sleeve.

6. A locomotive driving gear comprising a main and secondary driving axles, wheels fixed on said axles, crank pins rigidly mounted on all but the front driving wheels, crank pins for the front driving wheels, means for pivotally mounting said last mentioned crank pins in the front wheel centers, connecting rods whose ends are connected to adjacent crank pins, and main driving rods pivotally connected to the crank pins on the wheels of the main driving axle, each of said pivotal mounting means comprising an outer raceway member fitting a bore in a front wheel center and having two inwardly tapering conical raceways, separate rings overlapping the outer ends of said raceways and constituting thrust ribs, clamping members fastened to the ends of the wheel hub and abutting against said thrust rings, a crank pin member having a conical raceway surface in cooperative relation with one of the raceways of said outer raceway member, a sleeve slidable on said crank pin member and having a conical raceway in cooperative relation with the other outer raceway, tapered rollers between the inner and outer raceways, and a nut having threaded engagement with the end of said crank pin member opposite the end of said sleeve whereby said nut abuts against the end of said sleeve and serves to adjust said sleeve axially on the crank pin member and as an abutment for resisting the end thrust of said sleeve, the inner face of said wheel center being counterbored around said bore and the inner clamping plate lying mainly within said counterbore.

7. A locomotive driving gear comprising a main and secondary driving axles, wheels fixed on said axles, crank pins rigidly mounted on all but the front driving wheels, crank pins for the front driving wheels, means for pivotally mounting said last mentioned crank pins in the front wheel centers, connecting rods whose ends are connected to adjacent crank pins, and main driving rods pivotally connected to the crank pins on the wheels of the main driving axle, each of said pivotal mounting means comprising an outer raceway member fitting a bore in a front wheel center and having two inwardly tapering conical raceways, tapered rollers on said raceways, thrust ribs at the outer ends of said raceways, clamping members fastened to the ends of the wheel hub for positioning said outer raceway member, a crank pin member having a conical raceway surface in cooperative relation with one of the raceways of said outer raceway member, a sleeve slidable on said crank pin member and having a conical raceway in cooperative relation with the other outer raceway, and a nut having threaded engagement with the end of said crank pin member opposite the end of said sleeve whereby said nut abuts against the end of said sleeve and serves to adjust said sleeve axially on the crank pin member and as an abutment for resisting the end thrust of said sleeve.

8. A locomotive driving gear comprising a main and secondary driving axles, wheels fixed on said axles, crank pins rigidly mounted on all but the front driving wheels, crank pins for the front driving wheels, means for pivotally mounting said last mentioned crank pins in the front wheel centers, connecting rods whose ends are connected to adjacent crank pins, and main driving rods pivotally connected to the crank pins on the wheels of the main driving axle, each of said pivotal mounting means comprising an outer raceway member fitting a bore in a front wheel center and having two inwardly tapering conical raceways, tapered rollers on said raceways, thrust ribs at the outer ends of said raceways, clamping members fastened to the ends of the wheel hub for positioning said outer raceway member, a crank pin member having a conical raceway surface in cooperative relation with one of the raceways of said outer raceway member, a sleeve slidable on said crank pin member and having a conical raceway in cooperative relation with the other outer raceway, and a nut having threaded engagement with the ends of said crank pin member opposite the end of said sleeve whereby said nut abuts against the end of said sleeve and serves to adjust said sleeve axially on the crank pin member and as an abutment for resisting the end thrust of said sleeve, the inner face of said wheel center being counterbored around said bore and the inner clamping plate lying mainly within said counterbore.

9. A locomotive driving gear comprising a main and secondary driving axles, wheels fixed on said axles, crank pins rigidly mounted on all but the front driving wheels, crank pins for the front driving wheels, means for pivotally mounting said last mentioned crank pins in the front wheel centers, connecting rods, roller bearings connecting said connecting rods and crank pins, and roller bearings connecting the main driving rods to the crank pins on the wheels of the main driving axle, each of said pivotal mounting means comprising an outer raceway member fitting a bore in a front wheel center and having two inwardly tapering conical raceways, thrust ribs at the outer ends of said raceways, clamping members fastened to the ends of the wheel hub and abutting against said thrust ribs, a crank pin member having a conical raceway surface in cooperative relation with one of the raceways of said outer raceway member, a sleeve slidable on said crank pin member and having a conical raceway in cooperative relation with the other outer raceway, tapered roller bearings between the inner and outer raceways, and a nut having threaded engagement with the end of said crank pin member opposite the end of said sleeve whereby said nut abuts against the end of said sleeve and serves to adjust said sleeve axially on the crank pin member and as an abutment for resisting the end thrust of said sleeve.

TRACY V. BUCKWALTER.